US009326018B2

(12) United States Patent
Ryan et al.

(10) Patent No.: US 9,326,018 B2
(45) Date of Patent: Apr. 26, 2016

(54) METHOD AND APPARATUS FOR MANAGING USER INTERFACES

(75) Inventors: Mark Ryan, Norcross, GA (US); R. Tyler Wallis, Dallas, TX (US); William S. Robbins, Sun Prairie, WI (US); Susan Steele, Phillipsburg, GA (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 1348 days.

(21) Appl. No.: 12/339,383

(22) Filed: Dec. 19, 2008

(65) Prior Publication Data

US 2010/0162148 A1    Jun. 24, 2010

(51) Int. Cl.
    G06F 3/01      (2006.01)
    H04N 21/414    (2011.01)
    G06F 3/0488    (2013.01)

(52) U.S. Cl.
    CPC ...... H04N 21/41407 (2013.01); G06F 3/04886 (2013.01)

(58) Field of Classification Search
    CPC .............................. G06F 3/048; G06F 3/016
    USPC ......................................................... 715/702
    See application file for complete search history.

(56) References Cited

U.S. PATENT DOCUMENTS

| 5,146,556 | A  | * | 9/1992  | Hullot et al. .................. 715/790 |
| 6,035,305 | A  | * | 3/2000  | Strevey et al. ........................ 1/1 |
| 6,456,304 | B1 |   | 9/2002  | Angiulo et al. |
| 2003/0191816 | A1 | * | 10/2003 | Landress et al. ............. 709/219 |
| 2005/0050474 | A1 | * | 3/2005  | Bells et al. ..................... 715/747 |
| 2005/0078326 | A1 |   | 4/2005  | Stokes et al. |
| 2007/0083936 | A1 | * | 4/2007  | Booth et al. .................... 726/27 |
| 2008/0127255 | A1 | * | 5/2008  | Ress et al. ....................... 725/38 |
| 2008/0134176 | A1 | * | 6/2008  | Fitzgerald et al. ............... 718/1 |
| 2009/0076963 | A1 | * | 3/2009  | Worthington .................. 705/50 |
| 2009/0183213 | A1 | * | 7/2009  | Mukerji et al. ................ 725/95 |
| 2010/0013835 | A1 | * | 1/2010  | Kuhns .......................... 345/471 |
| 2010/0095348 | A1 | * | 4/2010  | Foster et al. ..................... 726/1 |
| 2010/0114705 | A1 | * | 5/2010  | Hoyle ........................ 705/14.54 |
| 2010/0211489 | A1 | * | 8/2010  | Zhang et al. .................... 705/34 |
| 2011/0009051 | A1 | * | 1/2011  | Khedouri et al. ........... 455/3.06 |

FOREIGN PATENT DOCUMENTS

WO    2008073205 A1    6/2008

\* cited by examiner

*Primary Examiner* — Angie Badawi
(74) *Attorney, Agent, or Firm* — Guntin & Gust, PLC; Jay H. Anderson

(57) ABSTRACT

A system that incorporates teachings of the present disclosure may include, for example, a communication device having a tablet with a touch-sensitive display. The tablet can be adapted to present a user interface (UI), receive a UI policy from a service provider of a communication system communicatively couplable to the tablet to manage operations of the UI, detect a request from a user of the tablet to adapt the UI, and manage the adaptation of the UI according to the UI policy. Other embodiments are disclosed.

21 Claims, 7 Drawing Sheets

METHOD AND APPARATUS FOR MANAGING USER INTERFACES

FIELD OF THE DISCLOSURE

The present disclosure relates generally to user interface presentation techniques and more specifically to a method and apparatus for managing user interfaces.

BACKGROUND

Most computing devices including mobile phones, computers, set-top boxes, just to mention a few, use an operating system to manage operations of the computing devices. Operating systems typically present a graphical user interface (GUI) on a display to enable users to manipulate operations of a device. The GUI can present for example drop-down menus, GUI buttons, system trays, or other common graphical elements to present the user a means to manage operations of the device and in some instance to make changes to the GUI (e.g., adding a wallpaper, change color scheme, create, delete or modify file folders, etc.).

DETAILED DESCRIPTION

One embodiment of the present disclosure can entail a communication device having a tablet with a touch-sensitive display. The tablet can be adapted to present a user interface (UI), receive a UI policy from a service provider of a communication system communicatively couplable to the tablet to manage operations of the UI, detect a request from a user of the tablet to adapt the UI, and manage the adaptation of the UI according to the UI policy. A base unit can be communicatively couplable to the tablet by way of a cordless phone protocol and a wireless data protocol to provide voice and data communication services to the tablet.

Another embodiment of the present disclosure can entail a computer-readable storage medium can have computer instructions to present a UI, receive from a communication system a UI policy to manage presentation aspects of the UI, detect a request to adapt the UI, and manage the adaptation of the UI according to the UI policy.

Yet another embodiment of the present disclosure can entail a communication system having a controller to transmit to a communication device a graphical user interface (GUI) policy to manage a GUI presented by an operating system of the communication device.

Figure 1:
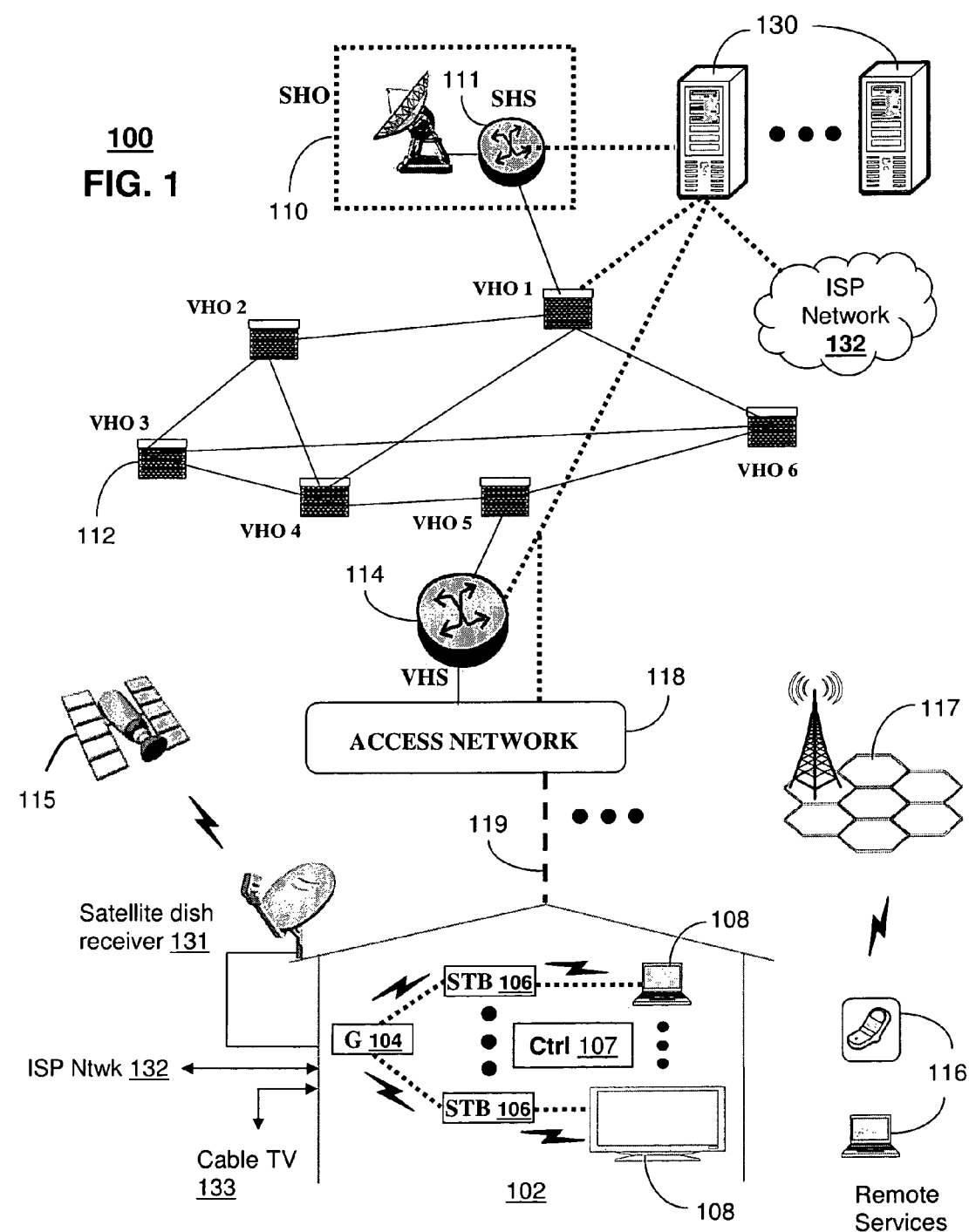
FIGS. 1-2 depict illustrative embodiments of communication systems that provide media services.

FIG. 1 depicts an illustrative embodiment of a first communication system 100 for delivering media content. The communication system 100 can represent an Internet Protocol Television (IPTV) broadcast media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a common residential or commercial gateway). The access network 118 can represent a group of digital subscriber line access multiplexers (DSLAMs) located in a central office or a service area interface that provide broadband services over optical links or copper twisted pairs to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered interface technologies (such as coaxial or phone line wiring) or can operate over a common wireless access protocol. With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on).

It will be appreciated by an artisan of ordinary skill in the art that a satellite broadcast television system can be used in place of the IPTV media system. In this embodiment, signals transmitted by a satellite 115 supplying media content can be intercepted by a common satellite dish receiver 131 coupled to the building 102. Modulated signals intercepted by the satellite dish receiver 131 can be submitted to the media processors 106 for generating broadcast channels which can be presented at the media devices 108. The media processors 106 can be equipped with a broadband port to the ISP network 132 to enable infrastructure services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services.

It follows from the above illustrations that the present disclosure can apply to any present or future interactive media content services.

Figure 2:
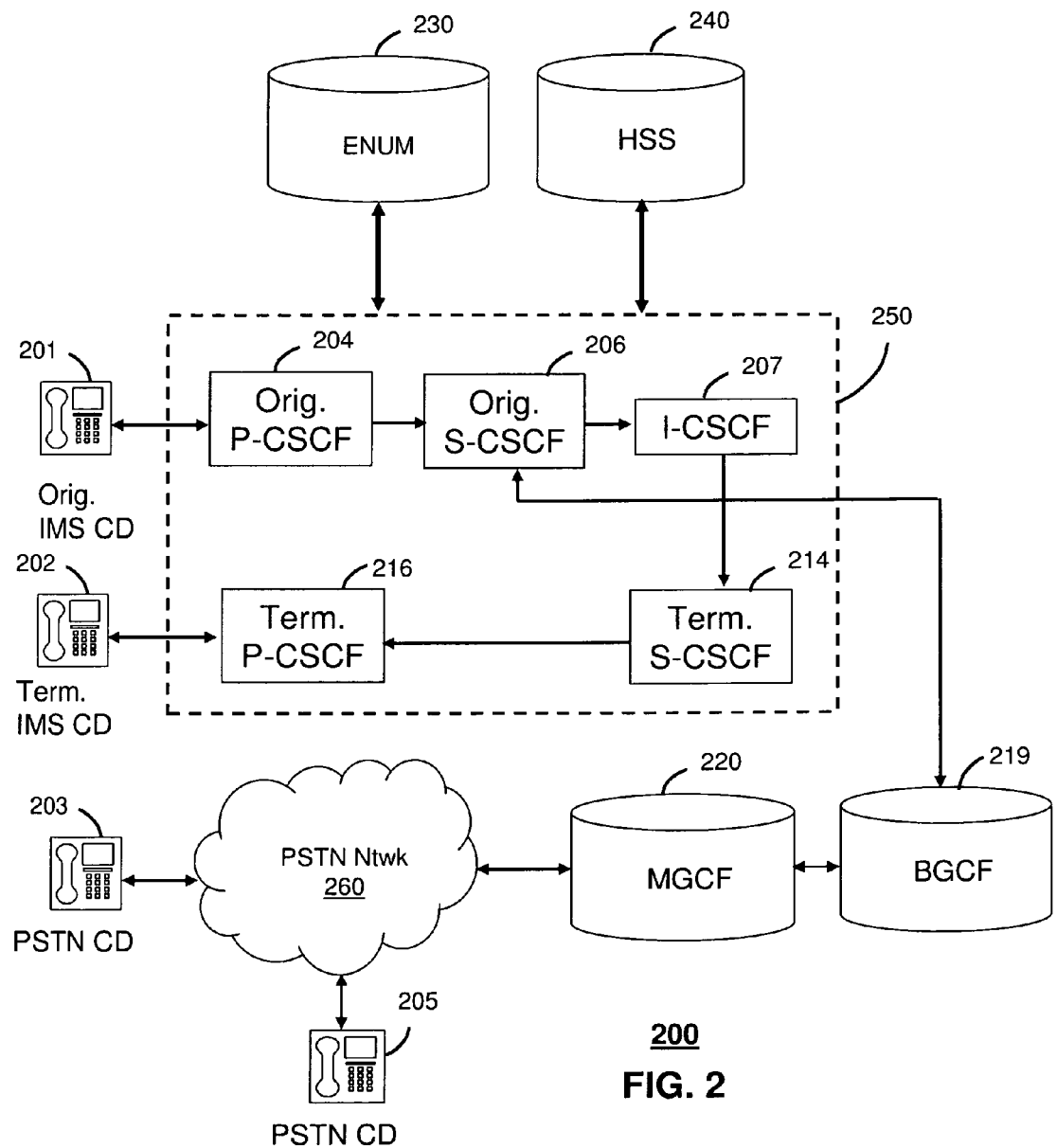

FIG. 2 depicts an illustrative embodiment of a communication system 200 employing an IP Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS compliant communication devices (CD) 201, 202, Public Switched Telephone Network (PSTN) CDs 203, 205, and combinations thereof by way of a Media Gateway Control Function (MGCF) 220 coupled to a PSTN network 260.

IMS CDs 201, 202 can register with the IMS network 250 by contacting a Proxy Call Session Control Function (P-CSCF) which communicates with a corresponding Serving CSCF (S-CSCF) to register the CDs with at the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit queries to the ENUM system 230 to translate an E.164 telephone number in the SIP INVITE to a SIP Uniform Resource Identifier (URI) if the terminating communication device is IMS compliant.

The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE to the terminating S-CSCF 214. The terminating S-CSCF 214 can then identify a terminating P-CSCF 216 associated with the terminating CD 202. The P-CSCF 216 then signals the CD 202 to establish communications.

If the terminating communication device is instead a PSTN CD such as references 203 or 205, the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD by common means over the PSTN network 260.

The aforementioned communication process is symmetrical. Accordingly, the terms "originating" and "terminating" in FIG. 2 are interchangeable. It is further noted that communication system 200 can be adapted to support video conferencing by way of common protocols such as H.323. In addition, communication system 200 can be adapted to provide the IMS CDs 201, 203 the multimedia and Internet services of communication system 100.

Figure 3:
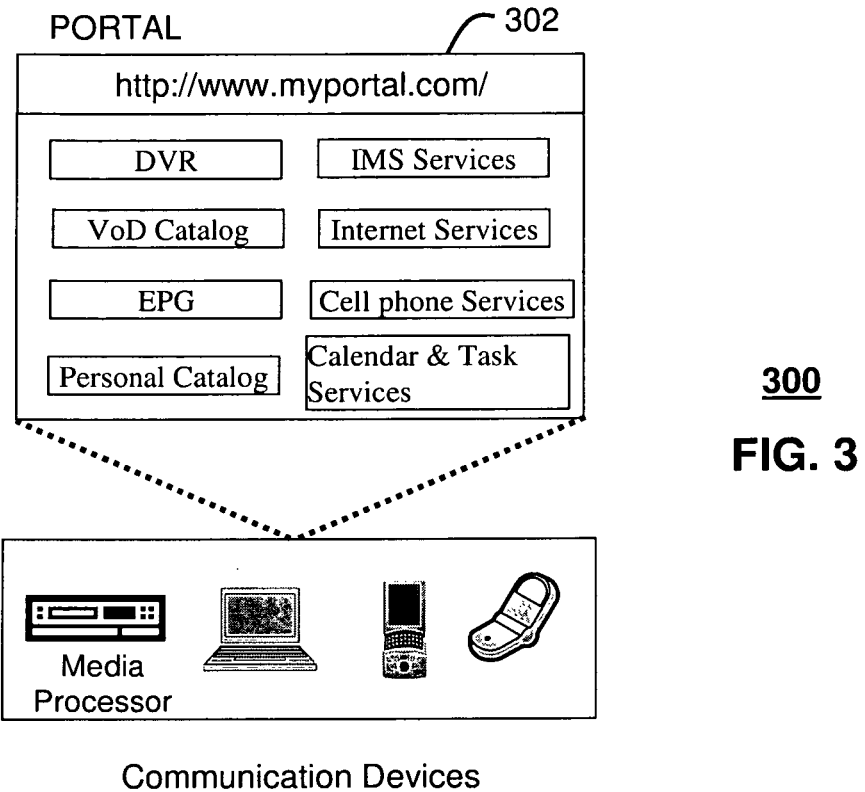
FIG. 3 depicts an illustrative embodiment of a portal interacting with the communication systems of FIGS. 1-2.

FIG. 3 depicts an illustrative embodiment of a portal 302 which can operate from the computing devices 130 described earlier of communication 100 illustrated in FIG. 1. The portal 302 can be used for managing services of communication systems 100-200. The portal 302 can be accessed by a Uniform Resource Locator (URL) with a common Internet browser such as Microsoft's Internet Explorer™ using an Internet-capable communication device such as those described for FIGS. 1-2. The portal 302 can be configured, for example, to access a media processor 106 and services managed thereby such as a Digital Video Recorder (DVR), a VoD catalog, an EPG, a personal catalog (such as personal videos, pictures, audio recordings, etc.) stored in the media processor, provisioning IMS services described earlier, provisioning Internet services, provisioning cellular phone services, provisioning calendar and task services, and so on.

Figure 4:
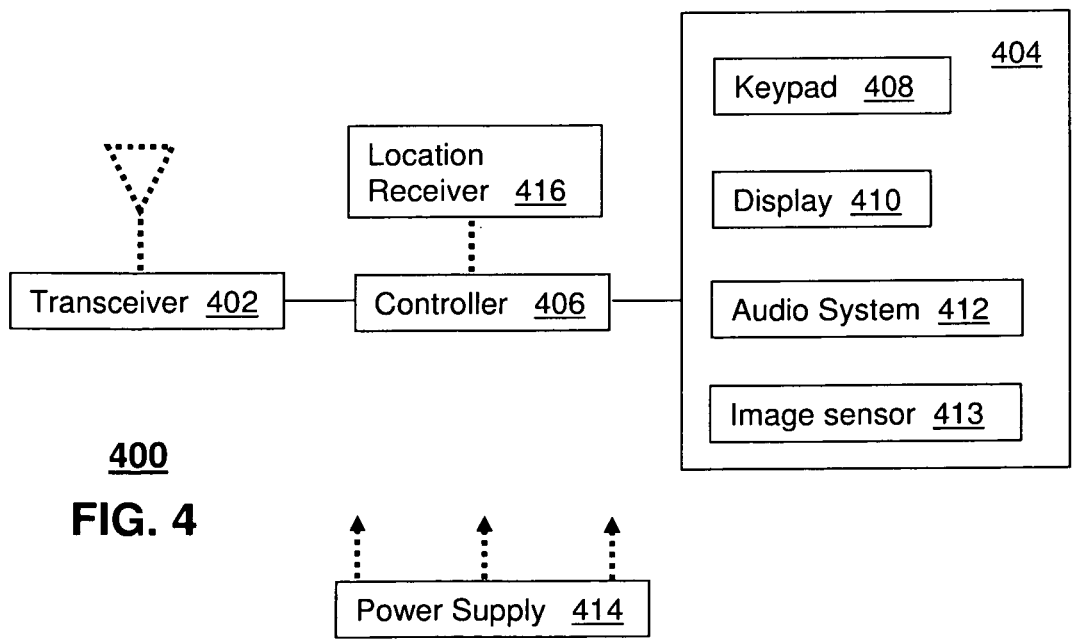
FIG. 4 depicts an illustrative embodiment of a communication device utilized in the communication systems of FIGS. 1-2.

FIG. 4 depicts an exemplary embodiment of a communication device 400. Communication 400 can serve in whole or in part as an illustrative embodiment of the communication devices of FIGS. 1-2. The communication device 400 can comprise a wireline and/or wireless transceiver 402 (herein transceiver 402), a user interface (UI) 404, a power supply 414, a location receiver 416, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, and next generation cellular wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 404 can include a depressible or touch-sensitive keypad 408 with a navigation mechanism such as a roller ball, joystick, mouse, or navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric dialing keypad commonly used by phones, and/or a Qwerty keypad with alpha-numeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. The location receiver 416 can utilize common location technology such as a global positioning system (GPS) receiver for identifying a location of the communication device 100 based on signals generated by a constellation of GPS satellites, thereby facilitating common location services such as navigation. The controller 406 can utilize computing technologies such as a microprocessor, a digital signal processor (DSP), and/or a video processor with associated storage memory such a Flash, ROM, RAM, SRAM, DRAM or other storage technologies.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

Figure 5:
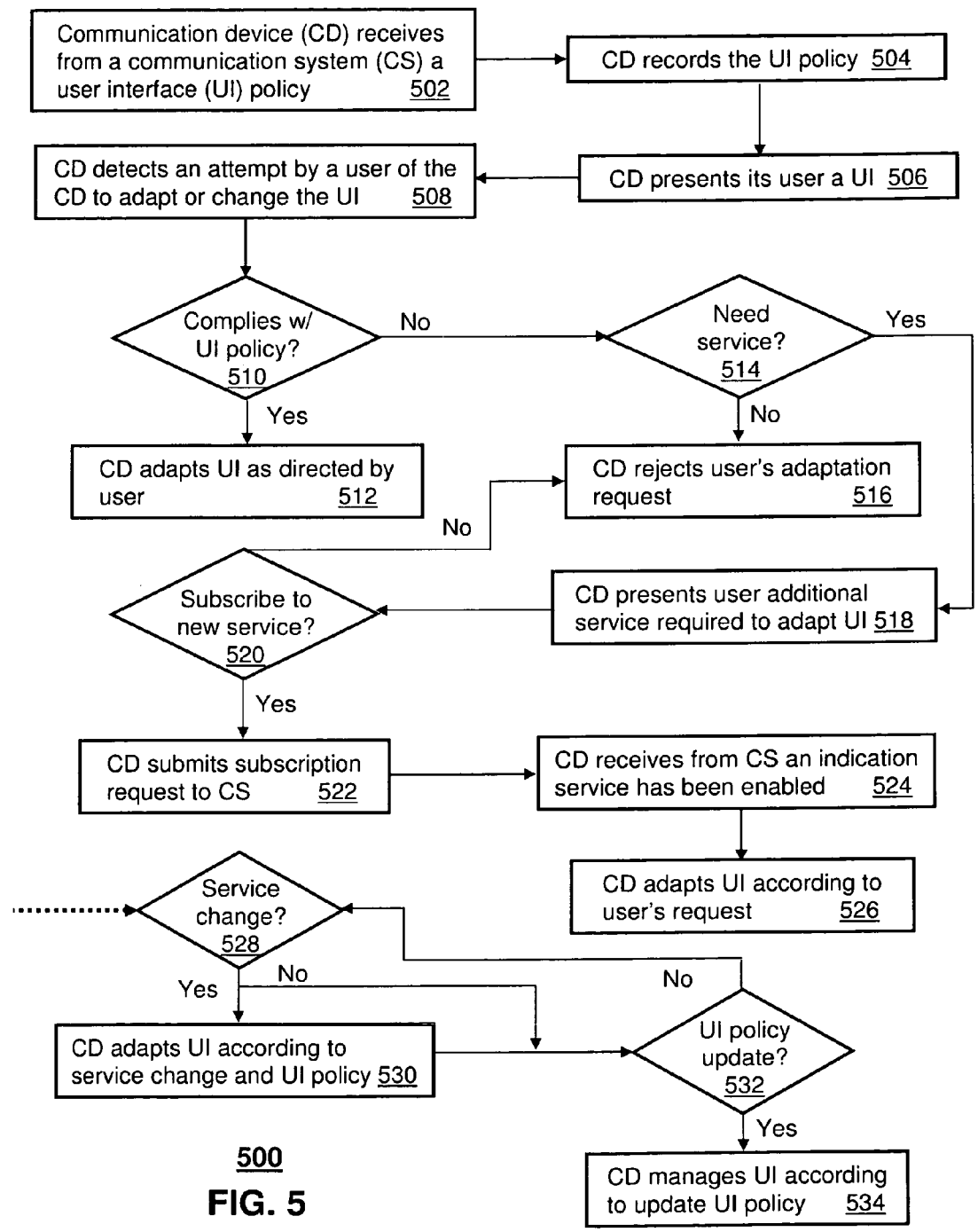
FIG. 5 depicts an illustrative embodiment of a method according to the present disclosure.
Figure 6:
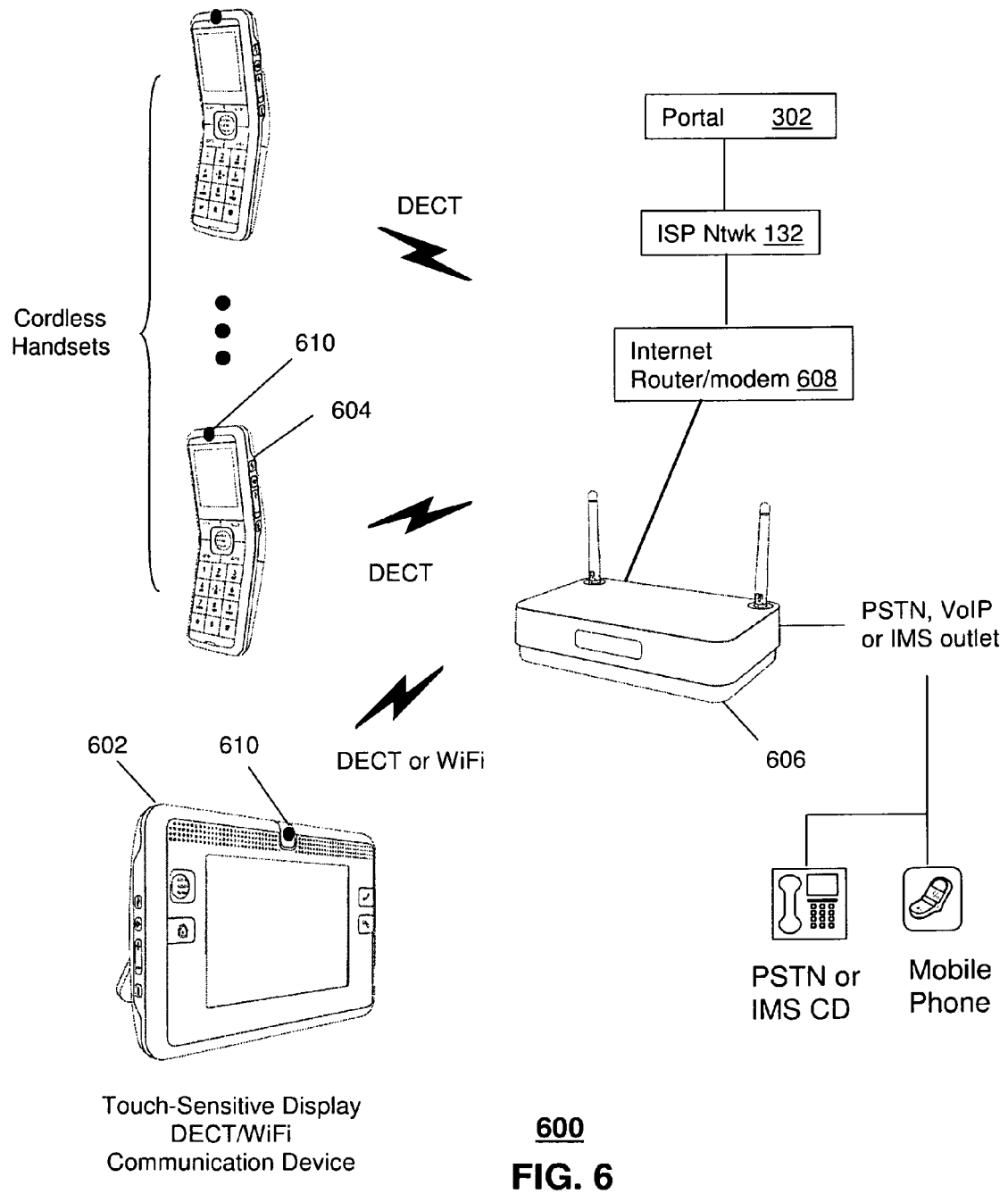
FIGS. 6-7 depict illustrative embodiments of the method of FIG. 5.

FIG. 5 depicts an illustrative method 500 for managing tasks. FIG. 6 shows an illustrative embodiment of a block diagram 600 of communication devices operating according to method 500. Block diagram 600 comprises a communication device 602 in the form of a tablet with a touch-sensitive display (herein referred to as tablet 602). The tablet 602 can include communication technology to support both DECT and WiFi protocols. The tablet 602 can be communicatively coupled to a base unit 606 by way of DECT and WiFi air interfaces. A plurality of cordless handsets 604 can also be communicatively coupled to the base unit 606 using the DECT protocol.

The base unit 606 can include communication technology for communicatively interfacing to a PSTN, VoIP or IMS network such as those described earlier. The base unit 606 can be coupled to an Internet/router modem 608 for communicatively interfacing to the portal 302 or other communication devices accessible by way of the ISP network 132 of FIG. 1. The base unit 606 can provide the cordless handsets voice communication services, and the tablet 602 a combination of voice and data communication services. The tablet 602 and cordless handsets 604 can be equipped with common camera sensors 610 (such as CCD sensors) which can enable these devices to support video communication services and capture still images or pictures.

Figure 7:
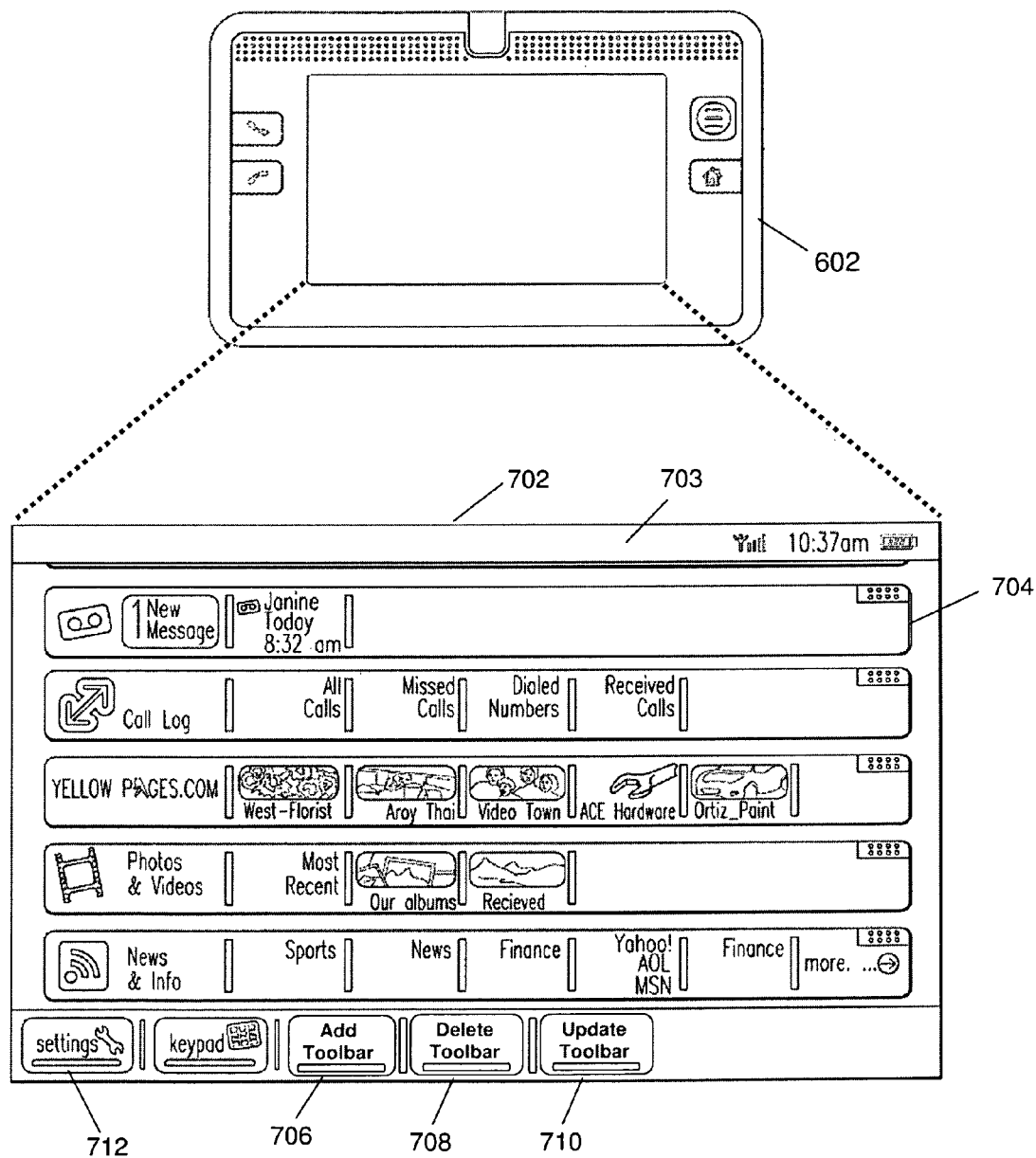

With the configuration of FIG. 6 in mind, method 500 can begin with step 502 in which a communication device such as the tablet 602 of FIG. 6 receives from a communication system such as the communication systems 100-200 of FIGS. 1-2 a user interface (UI) policy. The UI policy can be used for managing a UI 702 presented by the tablet 602 such as shown in FIG. 7. In this illustration, the UI 702 presented by the tablet 602 can comprise a plurality of toolbars 704, each performing a different function in the tablet. For example, the top toolbar can be used to identify voicemail messages. The second toolbar from the top can be used to show a communication log of all calls, missed calls, dialed numbers or received calls. Other toolbars can be used for accessing YellowPages.com, personal photos and videos, news and information, and so on. There are some toolbars that are not shown which can be accessed by scrolling the toolbars up or down with an index finger by way of the touch-sensitive display of the tablet 602.

The UI policy can describe for example a policy for removing one or more features of the UI 702 presented by the tablet 602 (e.g., removing existing toolbars), adding one or more features to the UI (e.g., adding new toolbars), managing color schemes in the UI (e.g., changing the color scheme of toolbars), managing relocation of one or more graphical features of the UI (e.g., reordering toolbars), and customization of one or more features of the UI (e.g., creating custom toolbars). The UI policy can describe a policy for adapting the UI 702 in any format or language suitable to the tablet 602 (e.g., a text file, an XML file, a file with graphics, metadata, computer instructions, and so on).

In step 504, the tablet 602 can record the UI policy in memory, and present the UI 702 in step 506 (as shown for example in FIG. 7) in conformance with the UI policy. The UI 702 can be generated by an operating system of the tablet 602 that manages the toolbars 704 shown in FIG. 7 among other operating aspects of the tablet. The operating system can represent a proprietary or commercially available software application that generates the UI 702 and manipulates operations of the tablet 602 according to selections made from the UI 702. Commercially available operating systems can include for example Microsoft Pocket PC™, Linux™, and other commercially available operating system applications. In step 508, the tablet 602 can detect an attempt by a user of the tablet 602 to adapt or modify the UI 702. In one embodiment, the adaptation can be responsive to the user attempting to drag a toolbar to a new location or order among the other toolbars. In another embodiment, the adaptation can be responsive to the user selecting the Add Toolbar button 706 to create a custom toolbar with functions defined by the user, or to select a toolbar from a list of predefined toolbars created by the service provider. In another embodiment, the adaptation can be responsive to the user selecting the Delete Toolbar button 708 to delete an existing toolbar.

In another embodiment, the adaptation can be responsive to the user selecting the Update Toolbar button 710 to update aspects of an existing toolbar (e.g., delete or add new subfunctions to a specific toolbar). In another embodiment, the adaptation can be responsive to the user selecting the Settings button 712 to change operational aspects of the UI 702 (e.g., how many toolbars are viewed in one screen, changing color schemes of the background or toolbars). There are innumerable changes that can be applied to the UI 702 which may be desirable to a user of the tablet 602, and which the user in step 508 can invoke by common manipulations of menus and GUI elements presented in the UI.

The UI policy can define a policy to manage the extent and flexibility provided to a user to adapt the UI 702. The UI policy can be defined for example by a service provider of the communication system from which the tablet 602 operates. The service provider can choose a specific UI policy to manage certain business objectives important to the service provider. For example, the UI policy can be used to impose a branding policy important to the service provider. The branding policy can restrict for example the user from selecting or changing certain color schemes which the service provider desires to maintain. The branding policy can also prevent removal or relocation of certain toolbars which the service provider desires to present at all times. The application of a branding policy can result in a look and feel for the UI 702 which conveys a branding image to users of the tablet 702.

The UI policy can also be used for defining how a service upgrade or service downgrade is to be addressed from a UI perspective. For example, the UI policy can describe the addition of features to the UI 702 (e.g., a new toolbar and/or icons on a status bar 703) when a new service is procured by the user. The new service can be for example voicemail service which may not have been available previously. Similarly, the UI policy can describe the removal of features from the UI 702 (e.g., the removal of a toolbar) when the user downgrades service. An illustration of this would be a case where the user terminates voicemail service resulting in the removal of the voicemail toolbar as instructed by the UI policy.

It would be apparent to an artisan with ordinary skill in the art that the UI policy can include instructions, graphics and other suitable forms of policy descriptors to manage and manipulate the UI 702 presented by the tablet 602. These other undescribed embodiments are contemplated by the present disclosure.

In step 510, the tablet 602 can determine if the adaption of the UI 702 requested by the user in step 508 complies with the UI policy. For example, suppose the user wants to delete a toolbar such as the YellowPages.com toolbar. If the request conforms with the UI policy, the tablet 602 proceeds to step 512 and adapts the UI 702 as directed (i.e., removing the YellowPages.com toolbar).

Suppose instead that the user wants to add a toolbar by selecting button 706, and is presented with a selectable list of predefined toolbars. Suppose also that the user selects a predefined toolbar associated with a service (e.g., a music on-demand service). If the tablet 602 detects in step 514 that the user is not subscribed to this service, the tablet 602 can proceed to step 518 where it presents the user by way of the UI 702 a prompt describing the need to subscribe to this service in order to adapt the UI as requested, and an option to initiate subscription by selection of a GUI button in the prompt. If the user does not subscribe to the new service in step 520, the tablet 602 proceeds to step 516 where it presents a prompt in the UI 702 indicating that the request to adapt the UI has been rejected.

If however the user directs the tablet 602 to subscribe the user in step 520 to the new service (by selecting the GUI button in the prompt of step 518), the tablet 602 proceeds to step 522 where it submits the subscription request to the communication system. In step the tablet 602 can receive an indication from the communication system that the service has been enabled. Responsive to the enablement of the service, the tablet 602 can proceed to step 526 and adapt the UI 702 as requested (e.g., adding a music on-demand toolbar which the user selected from the predefine list of toolbars mentioned earlier).

Referring back to step 508, suppose for example that the user requested the removal of the YellowPages.com toolbar. Further assume that this request does not comply with the UI policy (perhaps for brand policy reasons). Since removal of the YellowPages.com toolbar does not require a service, the tablet 602 would proceed from step 510 to step 514 and then to step 516 where it notifies the user that the requested adaptation of the UI is prohibited.

In addition to the aforementioned steps of method 500, the tablet 602 can be programmed to execute a background process for managing the UI 702 during service upgrades or downgrades, and for maintaining an up-to-date UI policy. The tablet 602 can for example monitor in step 528 a change of services supplied the communication system to the tablet. The change of services can arise from an upgrade or downgrade of service subscriptions which can be invoked by the service provider of the communication system and/or by the user for any number of reasons such as for example procurement of new services by the user, a request to downgrade services initiated by the user, a downgrade of services initiating by the service provider due to late payments, and so on.

When a service change is detected in step 528, the tablet 602 can be programmed to adapt the UI 702 according to the service change and as instructed by the UI policy. When services are added or removed, the UI policy can identify for example how toolbars in the UI 702 are to be updated. If there is no service change detected in step 528, the tablet 602 can monitor in step 532 if a new UI policy has been submitted by the communication system. If the UI policy has changed, the tablet 602 can be programmed to manage the UI 702 according to the updated UI policy. Steps 532 and 534 provide a means for service providers to update a UI policy as business circumstances change.

Upon reviewing the aforementioned embodiments, it would be evident to an artisan with ordinary skill in the art that said embodiments can be modified, reduced, or enhanced without departing from the scope and spirit of the claims described below. Method 500 can be adapted so that it applies to any UI format. The toolbars shown in FIG. 7 are but one example for an adaptation of a UI. Method 500 can be applied to any programmable adaptation of a UI. Additionally, method 500 can be adapted to other communication devices such as mobile phones, gaming consoles, and computers, just to mention a few.

Other suitable modifications can be applied to the present disclosure without departing from the scope of the claims below. Accordingly, the reader is directed to the claims section for a fuller understanding of the breadth and scope of the present disclosure.

Figure 8:
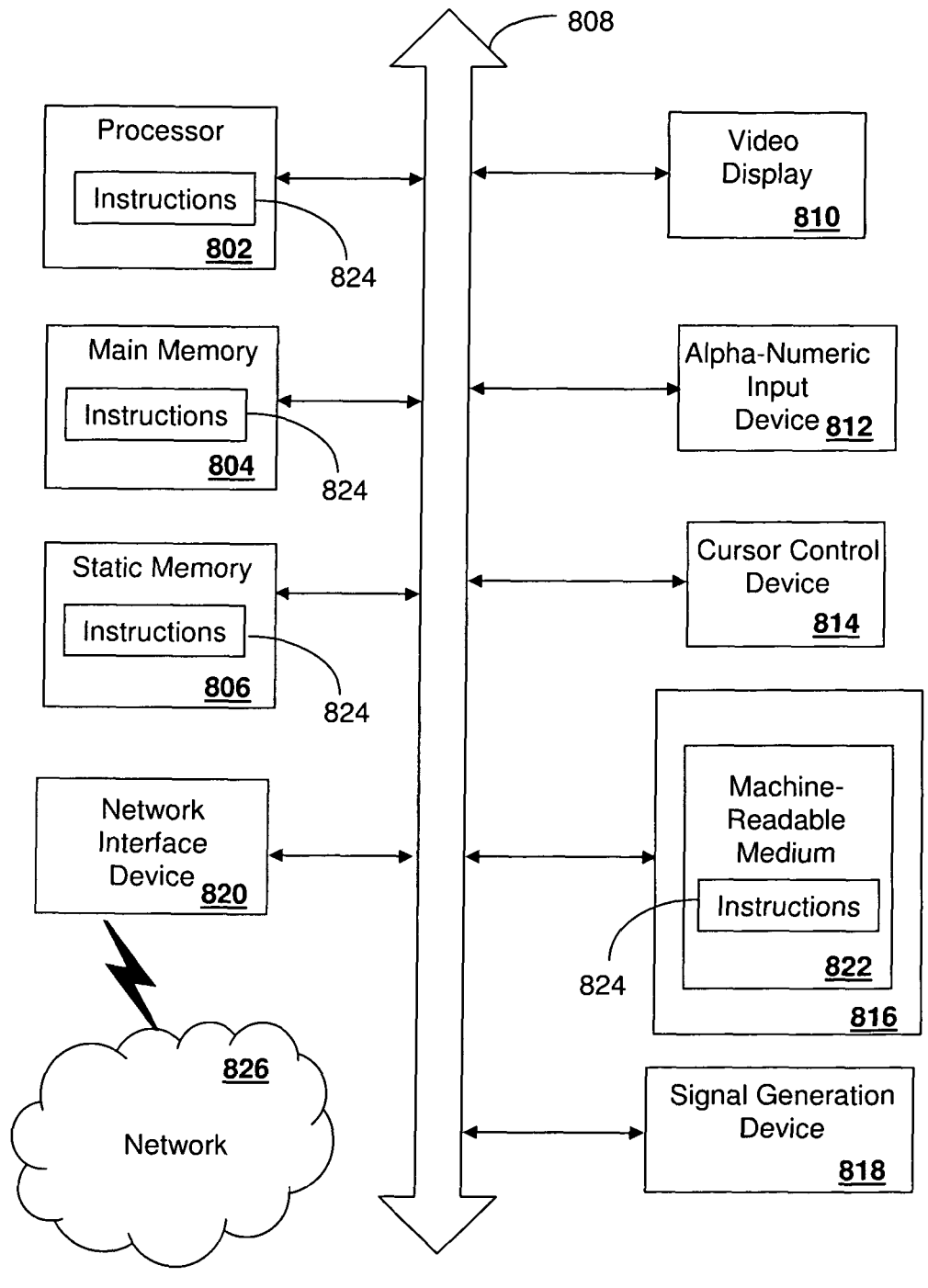
FIG. 8 is a diagrammatic representation of a machine in the form of a computer system within which a set of instructions, when executed, may cause the machine to perform any one or more of the methodologies discussed herein.

FIG. 8 depicts an exemplary diagrammatic representation of a machine in the form of a computer system 800 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 800 may include a processor 802 (e.g., a central processing unit (CPU), a graphics processing unit (GPU, or both), a main memory 804 and a static memory 806, which communicate with each other via a bus 808. The computer system 800 may further include a video display unit 810 (e.g., a liquid crystal display (LCD), a flat panel, a solid state display, or a cathode ray tube (CRT)). The computer system 800 may include an input device 812 (e.g., a keyboard), a cursor control device 814 (e.g., a mouse), a disk drive unit 816, a signal generation device 818 (e.g., a speaker or remote control) and a network interface device 820.

The disk drive unit 816 may include a machine-readable medium 822 on which is stored one or more sets of instructions (e.g., software 824) embodying any one or more of the methodologies or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 824, or that which receives and executes instructions 824 from a propagated signal so that a device connected to a network environment 826 can send or receive voice, video or data, and to communicate over the network 826 using the instructions 824. The instructions 824 may further be transmitted or received over a network 826 via the network interface device 820.

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
presenting, by a communication device comprising a processor, a user interface;
receiving, by the communication device, a user interface policy from a service provider of a communication system in communication with the communication device to manage operations of the user interface, the user interface policy including a branding policy comprising a look-and-feel of the user interface that, when presented at a touch-sensitive display of the communication device, is consistent with a brand image, the brand image thereby conveyed through the user interface;
detecting, by the communication device, a request from a user of the communication device to perform an adaptation of the user interface to generate an adapted user interface, wherein the adaptation of the user interface comprises an addition to the user interface associated with a service;
analyzing, by the communication device, the adapted user interface to determine compliance with the user interface policy;
managing, by the communication device, the adaptation of the user interface according to the user interface policy by:
determining whether the user is subscribed to the service,
responsive to determining that the user is not subscribed to the service, presenting to the user via the user interface an option to initiate a subscription to the service and thereby enable the service, and
rejecting the request to perform the adaptation of the user interface, responsive to the user not subscribing to the service; and
performing, by the communication device, the adaptation of the user interface responsive to determining that the user is subscribed to the service and determining that the adaptation of the user interface complies with the user interface policy.

2. The method of claim 1, further comprising:
presenting by way of the user interface a plurality of toolbars;
detecting the request from the user to adapt a toolbar of the plurality of toolbars; and
managing adaptation of the toolbar according to the user interface policy.

3. The method of claim 1, further comprising:
receiving information from the communication system indicating an enablement of an additional service and
adding a feature to the user interface according to the additional service and an instruction provided in the user interface policy.

4. The method of claim 1, further comprising:
receiving information from the communication system indicating a disablement of a service supplied to the communication device by the communication system; and
removing a feature from the user interface according to the disablement of the service and an instruction provided in the user interface policy.

5. The method of claim 1, wherein the user interface policy describes a policy for removing a feature of the user interface, adding a feature to the user interface, managing color schemes in the user interface, managing relocation of a graphical feature of the user interface, customization of a feature of the user interface, or a combination thereof.

6. The method of claim 1, wherein the operations further comprise:
receiving an update of the user interface policy responsive to a change in services provided to the communication device; and
managing the user interface according to the update of the user interface policy.

7. The method of claim 1, wherein the user interface policy prohibits removal of graphics representative of an identification of the service provider.

8. The method of claim 1, wherein the branding policy restricts changing of a color scheme of the user interface.

9. The method of claim 1, wherein the branding policy restricts removal of a graphical element of the user interface.

10. A non-transitory machine-readable storage medium, comprising instructions, wherein responsive to executing the instructions, a processor performs operations comprising:
presenting a user interface;
receiving from a communication system a user interface policy to manage presentation aspects of the user interface, the user interface policy including a branding policy comprising a look-and-feel of the user interface that, when presented at a display, is consistent with a brand image;
detecting a request to perform an adaptation of the user interface to generate an adapted user interface, wherein the adaptation of the user interface comprises an addition to the user interface associated with an on-demand service;
analyzing the adapted user interface to determine compliance with the user interface policy;
managing the adaptation of the user interface according to the user interface policy by:
determining whether the user is subscribed to the service,
responsive to determining that the user is not subscribed to the service, presenting to the user via the user interface a prompt indicating a need to subscribe to the service and an option to initiate a subscription to the service and thereby enable the service, and
rejecting the request responsive to the user not subscribing to the service; and
performing the adaptation of the user interface responsive to determining that the user is subscribed to the service and determining that the adaptation of the user interface complies with the user interface policy.

11. The non-transitory machine-readable storage medium of claim 10, wherein the storage medium operates in a mobile phone, and wherein the user interface policy prohibits removal of graphics representative of an identification of a service provider providing services via the communication system to the mobile phone.

12. The non-transitory machine-readable storage medium of claim 10, wherein the operations further comprise:
receiving information from the communication system indicating an enablement of the service; and
adding a feature to the user interface according to the service and an instruction provided in the user interface policy.

13. The non-transitory machine-readable storage medium of claim 10, wherein the operations further comprise:
receiving information from the communication system indicating a disablement of a service; and
removing a feature from the user interface according to the disablement of the service and an instruction provided in the user interface policy.

14. The non-transitory machine-readable storage medium of claim 10, wherein the user interface policy describes a policy for removing a feature of the user interface, adding a feature to the user interface, managing color schemes in the user interface, managing relocation of a graphical feature of the user interface, customization of a feature of the user interface, or a combination thereof.

15. The non-transitory machine-readable storage medium of claim 10, wherein the operations further comprise:
receiving an updated user interface policy; and
managing the user interface according to the updated user interface policy.

16. A communication system, comprising:
a memory that stores instructions; and
a controller circuit in communication with the memory, which when executing the instructions facilitates performance of operations comprising:
transmitting to a communication device a graphical user interface policy, the graphical user interface policy including a branding policy that, when presented at a display, is consistent with a brand image, to manage a graphical user interface presented by the communication device,
wherein, in accordance with the graphical user interface policy, the communication device is enabled to perform operations comprising:
determining compliance with the graphical user interface policy of an adaptation of the graphical user interface proposed by a user, the proposed adaptation of the graphical user interface comprising an addition to the graphical user interface associated with a service;
determining whether the user is subscribed to the service;
responsive to determining that the user is not subscribed to the service, presenting to the user via the graphical user interface an option to initiate a subscription to the service and thereby enable the service;
rejecting the proposed adaptation of the graphical user interface, responsive to the user not subscribing to the service; and performing the adaptation of the graphical user interface responsive to determining that the user is subscribed to the service and determining that the adaptation of the graphical user interface complies with the graphical user interface policy.

17. The communication system of claim 16, wherein the graphical user interface policy describes a policy for removing a feature of the graphical user interface, adding a feature to the graphical user interface, managing color schemes in the graphical user interface, managing relocation of a graphical feature of the graphical user interface, and customization of a feature of the graphical user interface.

18. The communication system of claim 16, wherein the operations further comprise transmitting information to the communication device indicating an enablement of the service, and wherein the communication device is adapted to add a feature to the graphical user interface according to the service and an instruction provided by the graphical user interface policy.

19. The communication system of claim 16, wherein the operations further comprise transmitting information to the communication device indicating a disablement of a service supplied to the communication device, and wherein the communication device is adapted to remove a feature from the graphical user interface according to the disablement of the service and an instruction provided by the graphical user interface policy.

20. The communication system of claim 16, wherein the operations further comprise transmitting to the communication device an update of the graphical user interface policy, wherein the communication device is adapted to manage the graphical user interface according to the update of the graphical user interface policy by prohibiting other proposed adaptations of the graphical user interface based on the update of the graphical user interface policy.

21. The communication system of claim 16, wherein the operations further comprise:
 receiving from the communication device a subscription request for the service; and
 transmitting information to the communication device indicating an enablement of the service, wherein the communication device is adapted to enable a feature of the graphical user interface according to the enabled service and an instruction provided in the graphical user interface policy.

* * * * *